No. 753,149. PATENTED FEB. 23, 1904.
J. J. LANKFORD.
PLUMB LEVEL.
APPLICATION FILED JULY 20, 1903.
NO MODEL. 2 SHEETS—SHEET 1.
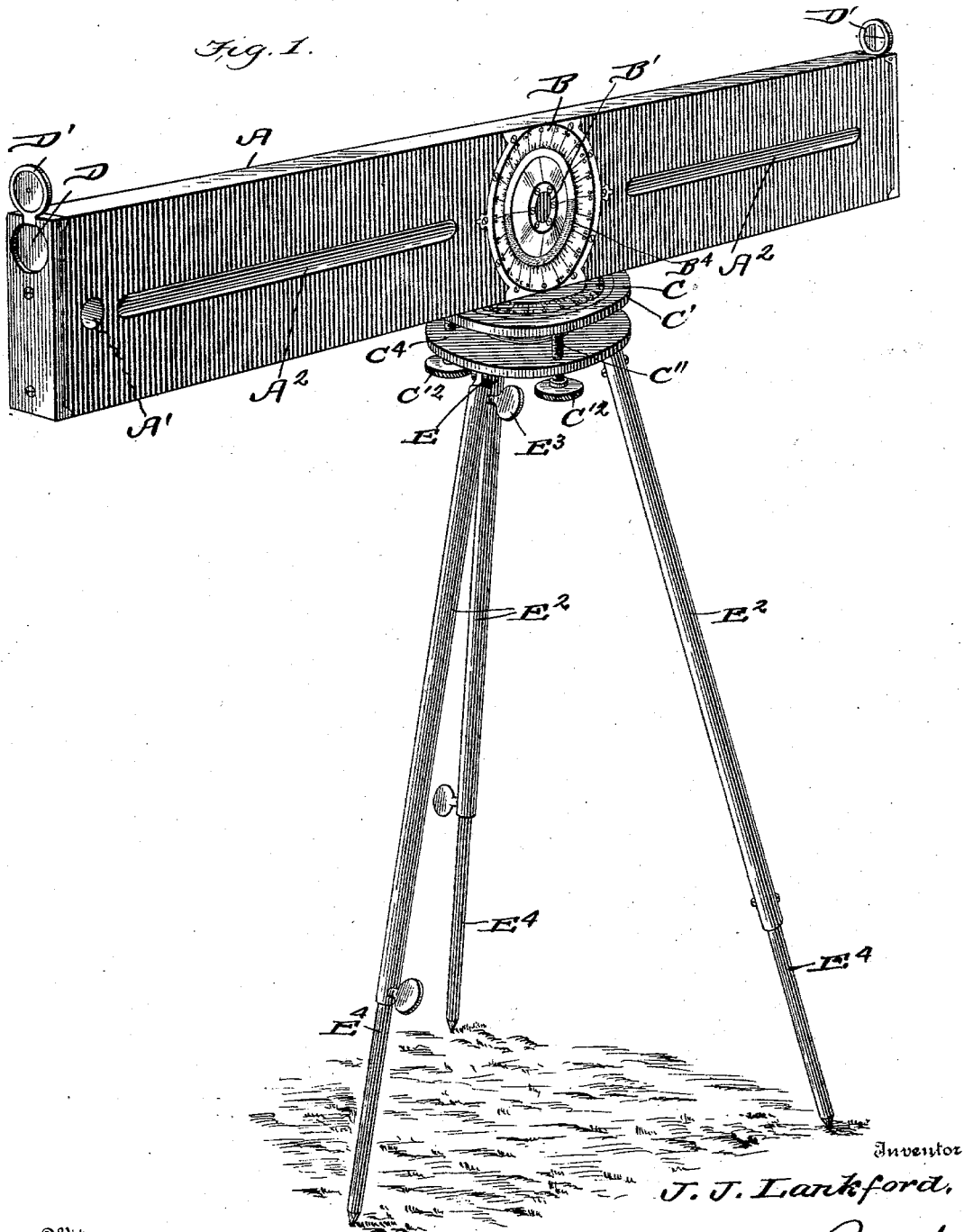

No. 753,149. PATENTED FEB. 23, 1904.
J. J. LANKFORD.
PLUMB LEVEL.
APPLICATION FILED JULY 20, 1903.
NO MODEL. 2 SHEETS—SHEET 2.
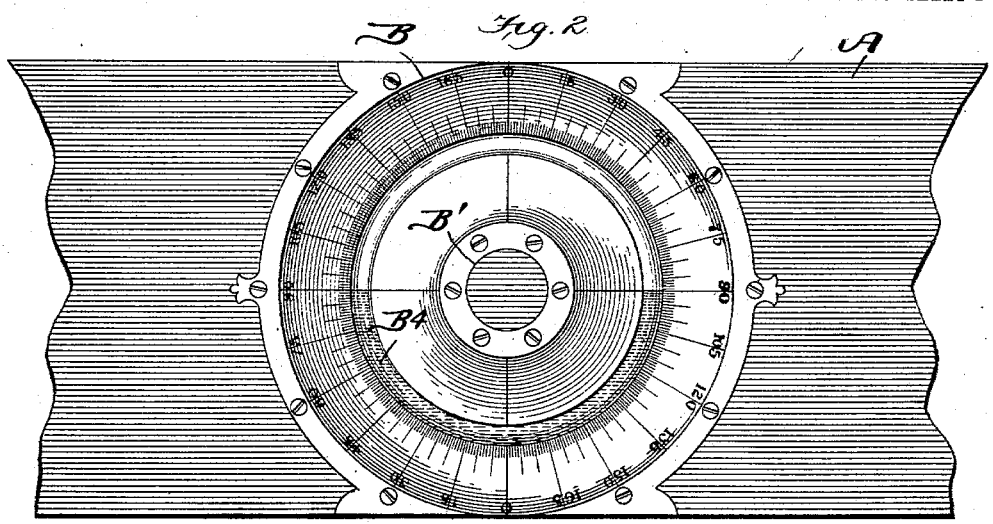
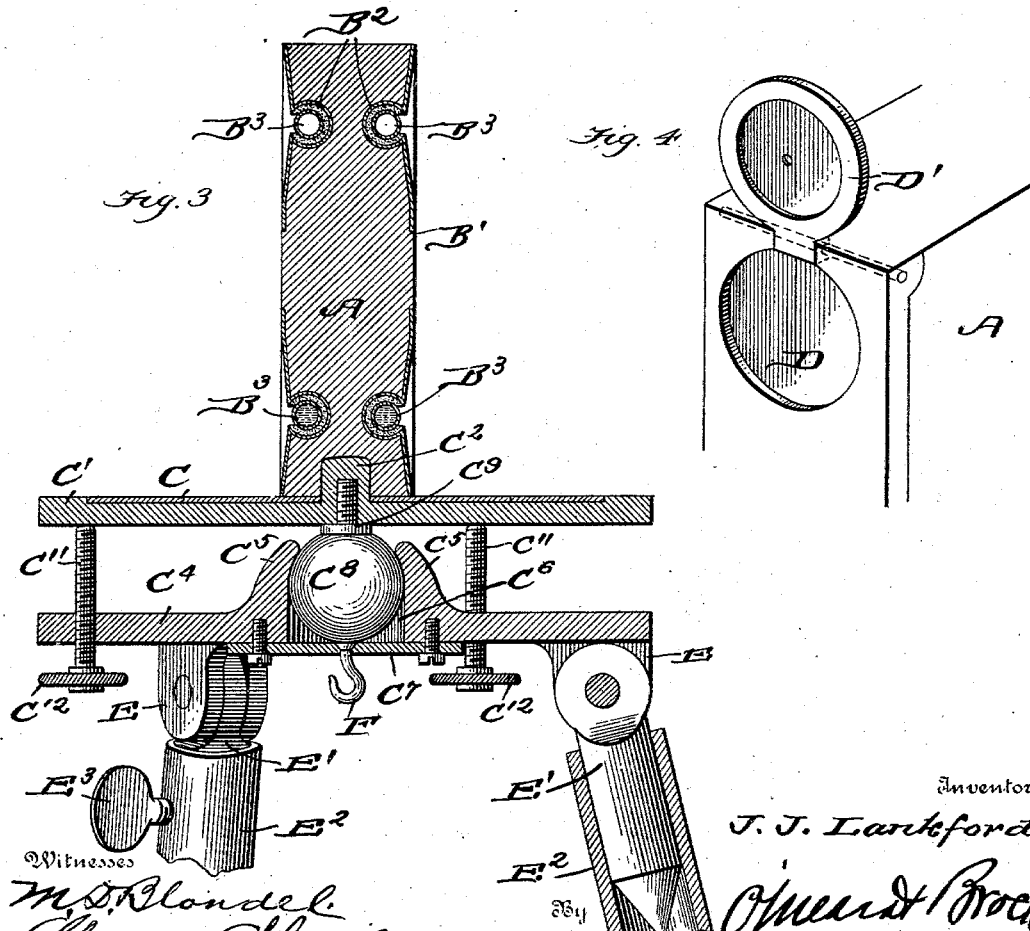

No. 753,149. Patented February 23, 1904.

UNITED STATES PATENT OFFICE.

JEROME J. LANKFORD, OF ACCOMAC, VIRGINIA.

PLUMB-LEVEL.

SPECIFICATION forming part of Letters Patent No. 753,149, dated February 23, 1904.

Application filed July 20, 1903. Serial No. 166,370. (No model.)

*To all whom it may concern:*

Be it known that I, JEROME J. LANKFORD, a citizen of the United States, residing at Accomac, in the county of Accomac and State of Virginia, have invented a new and useful Plumb-Level, of which the following is a specification.

My invention is an improvement in plumb-levels, and is designed especially as an improvement on the level for which I was granted United States Letters Patent No. 613,160.

The object of the invention is to improve the means for adjusting the various parts of the instrument relative to each other with a special view to ease of operation and accuracy of the adjustment.

My invention consists of the novel features of construction and combination of parts hereinafter shown and described, particularly pointed out in the claims, and shown in the accompanying drawings, in which—

Figure 1 is a perspective view of my improved level set up in position for use. Fig. 2 is a face view of a portion of the level, showing the circular tube and graduated scale. Fig. 3 is a vertical section through the circular tubes, transit-plate, and tripod-head, the supporting and connecting means being shown in elevation. Fig. 4 is a perspective view showing the sight at one end of the wheel.

In the drawings, A represents a level, shown as formed in one piece, though it may be built up of sections, if desired. This level has the aperture A' adjacent one end, and midway its ends the level has on each side a circular plate B, described in detail hereinafter. Longitudinal grooves $A^2$ are formed in the level on each side of these plates. The tips of the fingers will readily engage these grooves, and they thus facilitate the handling of the instrument. The plate B is centrally cut out, as shown at B', and is formed with an annular groove $B^2$, in which groove is arranged a circular glass tube $B^3$. As a protection of the tube the plate B is sunk into the face of the level, so that the level can be laid on the side without injury to the graduated scale or tube. This tube is filled with some suitable fluid, not freezable in any temperature, in which work with such an instrument is carried on, the fluid filling one-half of the tube, as shown at $B^4$.

At each end of the level and adjacent the top of same is formed a recess D, and hinged between each recess and the top is a sight D', these sights being adapted to be turned up above the top of the level or to be folded into the recesses. The transit-plate C is embedded into a circular block C', which block has a central standard $C^2$ projecting upward through the transit-plate and fitting into a suitable socket formed in the bottom of the level below the center of the plate B. The tripod-head $C^4$ has a central boss $C^5$, through which is a vertical opening $C^6$, closed at the bottom by a detachable plate $C^7$, secured to the block $C^4$ by suitable screws. The opening $C^6$ when closed by the plate $C^7$ forms a suitable socket for a ball $C^8$. A screw having a wear-head $C^9$ is inserted into the center of the block C' on the under side, the head $C^9$ being adapted to rest on the ball, which projects from the socket. Three threaded perforations are formed in the tripod-head at equal distances apart, and through these perforations extend upwardly three threaded rods $C^{11}$, each having a milled head $C^{12}$. The block C' rests upon the upper end of said rods, and it will be evident that by adjusting the rods the blocks C' and transit-plate C can be arranged at an angle to the tripod-head, the wear-head $C^9$ rocking on the ball $C^8$. These pair of lugs E depend from the tripod-head, and between the lugs of each pair are pivoted the upper ends of short legs E', which are pointed at their lower ends. These telescope into the upper section of the supporting-legs $E^2$ and are held in position by set-screws $E^3$. The supporting-legs $E^2$ have the usual extensions $E^4$.

It will be noted that this construction possesses the following advantages: The level can be quickly detached and used as an ordinary spirit-level without requiring manipulation of clamps and screws. The tripod-head can be readily adjusted, and the transit-plate can be adjusted with reference to the tripod-head and without interfering with the adjustment of the latter. The tripod-head can be quickly detached from the supporting-legs $E^2$ and set up on the short pointed legs E'. The construction is simple and the parts so combined that there is a minimum of wear. When used as a plumb-line level, the line is attached to a hook F, secured to the center of the plate C⁷.

Having thus fully described my invention, what I claim as new, and desire to secure by Letters Patent, is—

1. A device of the kind described comprising a level having recesses formed in each end, and a socket in the bottom midway the ends, a transit-plate block having a central standard adapted to fit into the socket of the level, sights hinged to the level between the recesses and the top of the level, and adapted to fold within the recesses, and means for supporting the transit-block.

2. The combination with a level and a transit-plate block, of a tripod-head having a central socket, a ball loosely held therein, a wear-plate on the under side of the block, adapted to rest on the ball, and threaded rods working vertically through the tripod-plate and adapted to support said block.

3. The combination with a level, a transit and a tripod-head, of short legs pivoted to the under side of the tripod-head, hollow sectional supporting-legs, the short legs sliding within the upper portion of the supporting-legs, set-screws adapted to lock them in position, means for holding a ball in the center of the tripod-head, a ball loosely resting in said holding means, a screw having a wear-head secured in the center of the transit and on the under side, said wear-head being adapted to rock on the ball, and means for adjusting the transit at an angle to the tripod-head.

4. The combination with a level having longitudinal grooves formed on each side thereof adjacent each end of the level, of a circular plate centrally cut out and set in each side of the level between the inner ends of the grooves, a circular glass tube set in each plate the tubes lying entirely within the planes of the side faces of the level, and a non-freezable fluid in an amount adapted to fill each tube to one-half of its capacity.

5. The combination with a level having a socket formed in its under face midway its ends, a transit-plate, a transit-block supporting said plate and having a central standard projecting upwardly through the plate adapted to fit in the socket of the level, a tripod-head having a central boss said boss having a vertical opening therein, a detachable plate adapted to close the lower end of the opening, a ball resting loosely in said opening on the detachable plate, and a wear-plate secured to the under side of the transit-block adapted to rest on the ball.

JEROME J. LANKFORD.

Witnesses:
W. P. LeRoy,
Claris Yeuell.